Oct. 25, 1932.  K. M. WHITE ET AL  1,884,446
MOTOR CONTROL SYSTEM
Filed Oct. 20, 1930  2 Sheets-Sheet 1
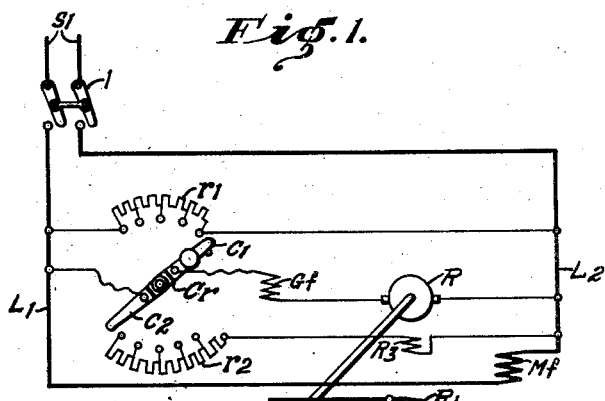
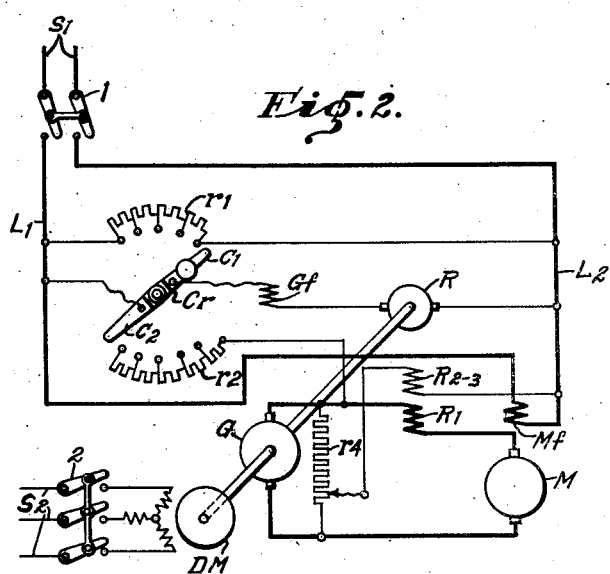
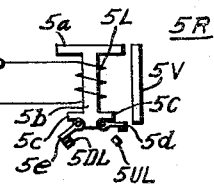
INVENTORS
Kenneth M. White &
George K. Hearn
BY
ATTORNEY

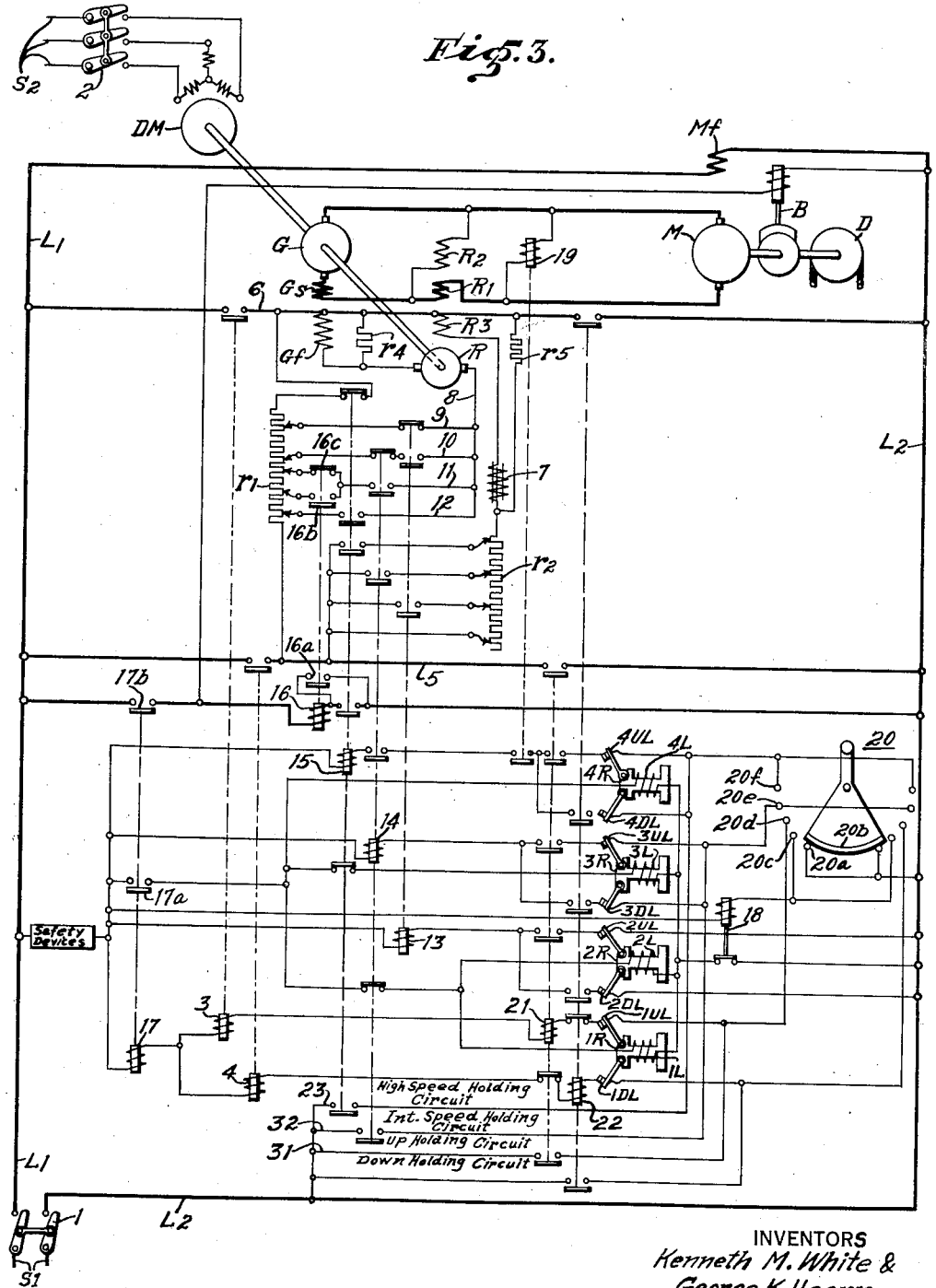

Patented Oct. 25, 1932

1,884,446

UNITED STATES PATENT OFFICE

KENNETH M. WHITE AND GEORGE K. HEARN, OF CHICAGO, ILLINOIS, ASSIGNORS TO WESTINGHOUSE ELECTRIC ELEVATOR COMPANY, A CORPORATION OF ILLINOIS

MOTOR-CONTROL SYSTEM

Application filed October 20, 1930. Serial No. 489,766.

Our invention relates to motor-control systems and has particular relation to motor-control systems of the variable-voltage or Ward Leonard type.

In one aspect, our invention relates to a method of and means for controlling the motor speed and rate of change of motor speed in such systems with a high degree of accuracy.

While our invention is applicable to any form of driven apparatus employing a variable-voltage or a multi-voltage drive, we particularly contemplate practicing it in connection with apparatus requiring a maximum of accuracy of motor-speed control, such as elevator systems and similar apparatus.

In the variable-voltage or Ward Leonard system, the armature of a separately excited motor is connected in a local circuit with the armature of a separately excited variable-voltage generator, driven at substantially constant speed; the speed of the motor being controlled by varying the generator voltage. Such an arrangement permits operation of the motor at any speed within a wide range, each speed corresponding to a particular value of generator field current.

The motor-speed regulation of such systems, in the absence of some correcting device, is poor, because of a variety of effects, such as the IR drops in the armature of the motor and generator and the speed regulation of the generator-driving means. These effects cause the motor speed to fall with positive or motoring loads and to rise with overhauling or regenerative loads. Within a considerable range of loads, this variation is approximately proportional to motor load and roughly the same for all operating speeds of the motor. For loads beyond this range, either motoring or regenerative, the proportionality is not maintained, and the motor speed falls to disproportionately low values with heavy motoring loads, or rises to disproportionately high values with heavy regenerative loads.

Various arrangements have been proposed in the prior art for raising the generator voltage with motoring loads and lowering it with overhauling loads a sufficient amount to maintain the motor speed substantially constant within the range of loads indicated above. According to one such arrangement, the generator is compounded by means of a cumulative series winding on the generator itself. According to a second arrangement, the compounding is introduced by means of an auxiliary generator or exciter, connected with its field winding in the common armature circuit of the motor and generator and its armature in series with the generator separately-excited field winding.

Either of these arrangements brings about a substantially accurate correction of the motor-speed regulation within the range of loads indicated above but either is generally sluggish in its action and is also critical as to stability, resulting in peculiarities of operation to be hereinafter more fully described. In either arrangement, the generator compounding is not as great at high motor speeds as at low motor speeds because of saturation of the generator magnetic circuit. When the motor is operating at high speeds, the generator iron is worked at a higher point on its magnetization curve, thereby reducing the change of generator field flux and generator voltage resulting from a given change of armature current. In order to maintain the same accuracy of motor-speed regulation at all speeds, in these arrangements, therefore, it is necessary to add some complications for changing the proportionate effect of the series ampere turns at high and at low speeds.

The degree of generator compounding necessary to maintain flat motor-speed regulation in these arrangements is such that the generator terminal voltage, upon a given increase of armature current, may rise an amount equal to, or greater than, the accompanying rise of motor armature IR drop. Under these conditions, the motor-armature circuit is unstable; the generator may build up as a series machine, causing armature currents to exist of values different from the value determined by the torque of the motor load. Under these circumstances, the phenomenon known as "pumping," i. e. oscillations of motor speed and armature current, due to instability of the armature circuit, may occur. In elevator systems, this action may take place during deceleration with overhauling loads and, when it occurs, gives rise to discomforting pauses in the elevator operation.

In either of the arrangements mentioned above, a considerable time interval is required for the system to adjust itself to final operating condition following either a change of resistance in the generator field circuit (resulting in a change of motor speed) or a change of armature current (resulting in a change of generator voltage without substantial change of motor speed).

Upon a change of resistance in the generator field circuit, the generator field current and generator voltage do not immediately assume their final values but follow exponential curves with respect to time, the change from an initial value to a final value being gradual. The delay resulting from this cause is not especially objectionable, as it is the same for all values of motor load and serves to cushion the changes of motor speed which would otherwise be quite abrupt. However, during the gradual change of generator field current and generator voltage noted above, the motor speed does not change simultaneously with the change of field current but lags somewhat because of the flywheel effect of the motor armature and the inertia of the motor load. That is to say, upon a change of motor speed, a change in the kinetic energy stored in the motor armature and other moving parts is required. This change of stored energy is brought about by a transfer of power between the main source of power of the system and the motor, through the common armature circuit of the generator and motor. As the maximum power flow in this circuit is limited by the resistance of the circuit, armature reaction of the machine, etc., the armature current and torque of the motor are correspondingly limited. As part of the torque of the motor is required to drive the unbalanced load; the remainder, which is available for acceleration or deceleration, is different for different values of unbalanced load. For this reason the lag of motor speed, occurring after changes of generator field resistance, is not uniform but varies with the motor load.

As mentioned above, either of these arrangements is also subject to a considerable time delay in the re-adjustment of the generator voltage following a change of load. This delay is caused principally by the action of the generator-separately-excited field winding. In the arrangement in which the generator is provided with a series winding, the generator-separately-excited winding acts as a damping winding to delay adjustments of the generator field flux in response to changes of armature current. Upon a change of armature current, a transient current is induced in the generator-separately-excited field winding by transformer action, this transient current being in such direction as to oppose the change of generator field flux. As the transient dies out, because of absorption of its energy in the resistance of the generator-separately-excited field circuit, the generator field flux and generator voltage gradually assume their corrected value for the change of load.

In the arrangement in which the generator compounding is introduced, by means of an exciter, as a voltage impressed upon the generator-separately-excited field winding; the latter winding, because of its high ratio of inductance to resistance, causes a similar delay between a change of exciter voltage and the corresponding change of generator field current. In either of these arrangements, if the generator field poles are solid, as is commonly the case, changes of generator excitation are further damped by eddy currents induced in the field poles themselves. The arrangements discussed above are, for the reasons stated, critical as to stability and generally sluggish, this sluggishness appearing as time lags in the re-adjustment of the apparatus to altered operating conditions. These time lags are, as stated above, of variable duration, depending upon the unbalanced load driven by the motor.

While, for many purposes, this sluggishness is not objectionable, it is particularly objectionable where the motor speed must be accurately controlled during acceleration or deceleration.

In elevator systems of the automatic-landing type, the speed of the car is gradually reduced, under control of hatchway switches of various types or of a floor selector, as the car approaches a desired landing, in order to bring the car to rest at the landing. In order to accomplish this operation uniformly without over-run or under-run, and, at the same time, to avoid sudden changes in car speed or in the rate of change of car speed, it is necessary that the motor speed shall follow a predetermined succession of values, each independent of load. During deceleration, the kinetic energy stored in the motor armature, the car, counterweight and other moving parts of the system is returned as electrical power through the common armature circuit of the motor and generator to the primary power source of the system. This power appears as a heavy regenerative component of the motor-armature current of sufficient value to reverse the direction of the motor current if the latter is not already regenerative. The motor-armature current during deceleration is, therefore, regenerative during the major part of the operation, and of rapidly changing character. If the generator voltage is unable to follow the rapid changes of armature current occurring under these conditions, as is the case in the variable-voltage systems discussed above, the motor speed is not controlled in the manner desired, and the deceleration curves of the motor are different for different elevator loads. If the elevator load is overhauling, as in lowering the car fully loaded or in raising the car empty with the assistance of the counterweight, the armature current commonly reaches such high regenerative values during deceleration that the elevator motor operates beyond the flat portion of its speed-regulation curve, thereby introducing a further inaccuracy in the levelling operation. Furthermore, under these conditions, the pumping action described above may occur, resulting not only in inaccuracy of levelling but also in discomfort to the passengers because of the abrupt variations in the rate of change of car speed which occur.

It is, accordingly, an object of our invention to provide a variable-voltage motor-control system in which means are provided for adjusting the voltage of the generator to maintain the speed of the motor constant, regardless of load, and for causing generator voltage to assume the adjusted value for any particular load conditions in a minimum of time.

Another object of our invention is to provide a variable-voltage motor-control system in which means are provided for adjusting the voltage of the generator to maintain the speed of the motor constant, regardless of load, and in which the common armature circuit of the generator and motor is stable under all operating conditions.

Another object of our invention is to provide a variable-voltage motor-control system in which the rate of change of motor speed may be accurately controlled, regardless of the motor load to permit uniform acceleration or deceleration of the motor under all load conditions.

Another object of our invention is to provide an elevator-control system in which the speed and rate of change of speed of the car during deceleration may be accurately controlled, regardless of the unbalanced elevator load.

Other objects of our invention will become evident from the following detailed description, taken in conjunction with the accompanying drawings, in which, Figures 1 and 2 are diagrammatic views of a system of control organized in accordance with the present invention.

Fig. 3 is a diagrammatic view of an elevator control system of the automatic-landing type, embodying the present invention.

Fig. 4 is a diagrammatic view showing the relation of inductor relays mounted on the car to inductor plates mounted in the hatchway in an elevator system of the type illustrated in Fig. 2.

Fig. 5 is a diagrammatic view illustrating the operation of an inductor relay.

Referring to the drawings, the apparatus shown in Fig. 1 comprises a motor M having its armature connected in a local circuit with a field winding R1 of a regulator R and the armature and series field winding $Gs$ of a generator G. In addition to the series winding $Gs$, the generator G is provided with a separately excited field winding $Gf$ arranged to be connected, in series with the armature of regulator R, to various taps of a resistor $r1$ by means of an arm C1 of a controller $Cr$. The resistor R1 is connected as a potentiometer between a pair of supply conductors L1 and L2.

In addition to the winding R1, which is of series type, the regulator R is provided with two windings R2 and R3 of shunt type. The winding R3 is arranged to be connected to the supply conductors L1 and L2 in circuit with a resistor $r2$ by means of a second arm C2 of the controller $Cr$, which arm also serves as a means for varying the amount of resistance included in the circuit. The winding R2 is connected in parallel with the armature of motor M.

The generator G and regulator R are arranged to be driven at substantially constant speed by any suitable means. For this purpose, the armatures of generator G and regulator R may be mounted on a common shaft with any suitable driving means DM, which we have illustrated as an induction motor.

The supply conductors L1 and L2 are arranged to be connected to a suitable direct-current source S1 by means of a switch 1. The windings of induction motor DM are arranged to be connected to a suitable alternating-current source S2 by means of a switch 2.

The series winding $Gs$ of generator G is cumulatively connected and is designed to raise the voltage of generator G an amount proportional to the load and sufficient to maintain the speed of motor M substantially constant, regardless of load. The purpose of this winding is to adjust the generator voltage roughly to the value at which it will be maintained by the action of the regulator R. As, according to our invention, the motor speed is controlled principally by the action of regulator R, the winding $Gs$ may be designed with less turns than are necessary to maintain the motor speed constant, or they may be omitted entirely.

The windings R1 and R2 of the regulator R are designed to produce, by their joint action, a magnetomotive force in the regulator magnetic structure at all times proportional to the counter-electromotive force and the speed of motor M. The winding R2, being connected across the motor armature, produces a magnetomotive force proportional to the motor terminal voltage. The number of turns of winding R1 is so selected with respect to number of turns of winding R2 that the magnetomotive force of winding R1 bears the same relation to the magnetomotive force of winding R2 as the motor terminal voltage does to the motor IR drop. The winding R1 is so connected that its magnetomotive force opposes the magnetomotive force of winding R2 when the direction of power flow in the common armature circuit of generator G and motor M is from the generator to the motor and assists the magnetomotive force of winding R2 when the direction of power flow is from the motor to the generator. With this arrangement, the algebraic sum of the magnetomotive forces produced by windings R1 and R2 is always proportional to the motor counter-electromotive force, and, therefore, assuming constant excitation of the motor M, is proportional to the motor speed.

The winding R3 of regulator R is so connected that the magnetomotive force produced by it opposes the magnetomotive force produced by the joint action of windings R1 and R2. The winding R3 is so designed with respect to the winding R2 that, when the full voltage of supply conductors L1 and L2 is impressed on winding R3, it produces the same magnetomotive force as that produced by the winding R2 when the rated voltage of generator G is impressed on the latter winding.

By reason of the fact that the magnetomotive forces of windings R2 and R3 are always in opposition, it may, in some cases, be desirable to replace these two windings by a single winding which is subjected to the difference between the generated voltage of machine G and the supply voltage. This arrangement is shown in Fig. 2, wherein the circuit of winding R2–3, in addition to being connected between the supply conductors L1 and L2 in series with regulating resistor r2, is also connected across the terminals of generator G by way of the potentiometer resistor r4. As stated above, the connection is such that these two voltages are in opposition. The arrangement of Fig. 2 is, in all other respects, identical with that of Fig. 1.

As will be hereinafter more fully explained, the regulator R impresses a correction voltage on the main generator field winding Gf proportional to the difference between the actual speed of motor M and a desired speed determined by the setting of the control apparatus. The ratio cf the percentage change of voltage impressed on winding Gf to the percentage error of motor speed which causes the correction voltage may, by selecting sets of windings R1, R2 and R3, related to each other as outlined above, be fixed at any desired value. If this ratio is fixed at 5 to 1, for example; when the error of motor speed is +3%, the correction voltage will be −15%, when the error in motor speed is +2%, the correction voltage will be −10%, etc., the correction voltage disappearing when the error in motor speed becomes zero.

The magnetic circuit of regulator R, is preferably so designed that its residual magnetism is a minimum. This may be accomplished by laminating the magnetic structure, selection of special magnetic material or other means known in the art. We also prefer to limit the maximum voltage of the regulator R to a predetermined fraction of the voltage of supply conductors L1 and L2. While this may be accomplished in a variety of ways, with or without the use of external devices, we prefer to so notch the field poles of the regulator that the voltage of the regulator, because of saturation, cannot materially exceed the desired maximum.

The operation of the apparatus shown in Fig. 1 may be set forth as follows: Preliminary to operation of the motor M, the switches 1 and 2 are closed. Upon closure of switch 1, the field winding Mf of motor M is connected to source S1, causing the current in the field winding Mf to build up to its operating value in the usual manner. Upon closure of the switch 2, the induction motor DM, generator G and regulator R accelerate to running speed. As the field winding Gf of the generator G is, at this time, disconnected, the generator G generates no voltage, the current in the common armature circuit of generator G and motor M is zero, and the motor M is at rest.

The motor M may now be put into operation by manipulation of the controller Cr. Upon movement of the handle of controller Cr to the right to its first operating position, a circuit is completed from supply conductor L1, through the arm C2 of controller Cr, all of resistor r2 and the field winding R3 of regulator R, to supply conductor L2.

At the same time, the common circuit of the armature of regulator R and generator field winding Gf is connected across a portion of potentiometer resistor r1 by means of the arm C1 of controller Cr. As the current in field winding R3 of regulator R builds up, the regulator develops an armature voltage which acts in the same direction, upon the separately-excited field winding Gf of the generator G, as the voltage due to the potentiometer resistor r1. An excessive voltage is, therefore, impressed upon the field winding Gf, and the current in the latter winding builds up rapidly. As the current in field winding Gf builds up, the armature of generator G develops a voltage which causes a current to flow in the common armature circuit of generator G and motor M. This current causes the motor M to exert a torque and to accelerate. As the speed of motor M increases, its counter-electromotive force increases, causing a proportionate increase in the component of regulator field M. M. F. due to the joint action of winding R1 and R2. As this component increases, the total flux of the regulator and the armature voltage of the regulator decrease, thereby reducing the excess voltage applied to the field winding Gf. As the speed of motor M approaches the desired value fixed by the low-speed position of controller Cr, the M. M. F. caused by the joint action of windings R1 and R2 become equal to the M. M. F. caused by winding R3, and the armature voltage of regulator R falls to zero. The motor M now operates at low speed. During the acceleration process described above, the excess voltage applied to the field winding Gf not only acts to reduce the time required for the building up of the current in the field winding Gf but also acts to maintain a high accelerating torque on the motor M as long as the speed of the motor is below its desired value. That is to say, the regulator R maintains a correction voltage as long as the speed of motor M, for any reason, remains below its intended value. The voltage of generator G may, therefore, momentarily rise above its final value if the rate of increase of motor speed, for any reason, such as the inertia of the motor load, falls sufficiently below the rate of increase of generator field current.

If the speed of motor M tends to change because of a change of load, the regulator R, as soon as the change of speed commences, impresses a voltage on the field winding Gf in a direction to cause the generator voltage to compensate for the change. The correction voltage of the regulator R is of such value that, if continued indefinitely, it would cause a greater change of generator voltage than that necessary to compensate for the change of load. This causes a rapid change of generator terminal voltage, the correction voltage of regulator R gradually falling as the terminal voltage of generator G assumes the corrected value necessary to maintain the speed of motor M at its desired low-speed value.

If the handle of controller Cr is moved farther to the right to its next operating position, a section of resistor r2 is removed from the circuit of regulator field winding R3 by the arm C2, and the potentiometer voltage impressed upon the common circuit of the field winding Gf of generator G and the armature of regulator R is increased to a second value by movement of the arm C1. The motor M now accelerates to a higher speed in the manner previously described. Further movement of the handle of controller Cr to the right successively to each of the three remaining controller positions, successively increases the speed of motor M in increments to full-speed value. The motor may be brought to rest by returning the handle of controller Cr to its illustrated position.

With the arrangement described above, the motor-speed regulation is determined by the ratio of the motor speed to the motor counter-electromotive force. As this ratio is not affected by factors such as variations of the speed of the generator driving means in response to variations of load; variations of the generator voltage because of armature reaction and IR drop; reduction of the generator compounding at high motor speed because of saturation of the generator magnetic circuit, etc., the motor-speed regulation is rendered independent of these factors within reasonable operating limits. The motor-speed-regulation curves obtained with our system are, for this reason, substantially flat under all ordinary operating conditions.

As mentioned above, since the correction voltage introduced by the regulator R disappears when the motor is operating at its intended speed, the ratio of the percentage change of voltage impressed upon the field winding Gf, to the percentage error of motor speed which caused it, may be fixed at any desired value. The greater this ratio is made, the more rapid will be the response of the generator and motor to altered operating conditions. We have found that very satisfactory results are obtained with this ratio fixed at about 5 to 1. However, with such a high ratio, the changes of motor speed in response to operation of the control apparatus may, under certain circumstances, be too rapid, resulting in rates of motor acceleration and deceleration and values of armature current which are too high. We, therefore, prefer, as previously mentioned, to limit the maximum voltage of the regulator R to a fraction of the voltage available for the generator-separately-excited field winding. For example, in a system in which the voltage impressed on the generator-separately-excited field winding for operation of the motor at high speed is 240 volts, we prefer to limit the maximum voltage of regulator R, by notching its field poles as previously mentioned, to approximately 60 volts.

If, for any reason, such as temperature changes during operation, the terminal voltage of generator G tends to rise a greater amount, for a given increase of armature current, than the corresponding rise of IR drop in the armature of motor M, the balance between the magnetomotive forces of windings R2 and R3 is disturbed. The unbalanced component of the magnetomotive force of winding R2 now acts to produce a voltage upon the field winding Gf in opposition to the change of generator voltage. Because of this action of winding R2, the generator G cannot build up as a series generator, and the armature circuit is stable under all operating conditions.

Referring to Fig. 3 of the accompanying drawings, which shows, diagrammatically, an elevator system embodying our invention, an elevator motor M is connected with its armature in a local circuit with a winding R1 of a regulator R and the armature and series winding Gs of a generator G. The field winding Mf of motor M is connected to suitable supply conductors L1 and L2.

The armature of motor M is mounted on a common shaft with a spring-pressed electromagnetically-released brake B, of usual type, and a hoisting drum D. As shown in Fig. 4, an elevator car C is suspended by means of a cable Ca which passes over the drum D to a suitable counterweight Cw.

Returning to Fig. 3, the generator G, in addition to the series winding Gs, is provided with a separately-excited field winding Gf. The regulator R, in addition to the winding R1 which is of series type, is provided with two windings R2 and R3 of shunt type, as in Fig. 1.

The generator G and regulator R are arranged to be driven at substantially constant speed by any suitable means. For this purpose, the armatures of generator G and regulator R may be mounted on a common shaft with any suitable driving means DM, which we have illustrated as an induction motor.

A pair of supply conductors L1 and L2 is arranged to be connected to a suitable direct-current source S1 by means of a switch 1. The windings of induction motor DM are arranged to be connected to a suitable alternating-current source S2 by means of a switch 2.

The series winding Gs of generator G is cumulatively connected and is designed to raise the voltage of generator G an amount proportional to the load and sufficient to maintain the speed of motor M substantially constant, regardless of load. As in Fig. 1, this winding may be designed with less turns than necesary to accomplish that result or may be omitted entirely.

The windings R1 and R2 of regulator R, as in Fig. 1, are designed to produce, jointly, a magnetomotive force proportional to the counter-electromotive force and speed of motor M.

The winding R3, as in Fig. 1, is so connected that the magnetomotive force produced by it opposes the magnetomotive force produced by the joint action of windings R1 and R2.

A conductor 5 is arranged to be connected to supply conductor L2 by means of a reversing switch 21 or to supply conductor L1 by means of a reversing switch 4. Another conductor 6 is arranged to be connected to supply conductor L1 by means of a reversing switch 3 or to supply conductor L2 by means of a reversing switch 22. The circuits, through which a reversal of current is necessary in order to reverse the direction of rotation of motor M, are connected in parallel between the conductors 5 and 6. These circuits are, first, a circuit including a potentiometer resistor r1 and contact members of a high-speed switch 15 and, second, a circuit including the field winding R3 of regulator R, a choke coil 7 and a resistor r2. A circuit, including a conductor 8, the generator-separately-excited field winding Gf and the armature of regulator R, is connected between conductor 6 and the potentiometer resistor r1. One terminal of this circuit is arranged to be transferred from point to point along the potentiometer resistor r1, through conductors 9, 10, 11 and 12, by means of contact members of a low-speed switch 13, an intermediate-speed switch 14, a high-speed switch 15 and a transfer relay 16.

The transfer relay 16 is provided for altering the proportionate amount of potentiometer resistor r1 commutated during the steps of deceleration, depending upon whether the decelerating operation is initiated from intermediate speed, or from high speed.

In addition to transferring the connection of conductor 8 from point to point along the potentiometer resistor r1, the switches 13, 14 and 15 are arranged to short circuit steps of resistor r2 and to complete various interlock connections hereinafter more fully described.

A brake relay 17 is provided for controlling the release winding of brake B and the operating coil of transfer relay 16.

A relay 18 is provided for controlling a common circuit for the windings 1L, 2L, 3L and 4L of a set of inductor relays 1R, 2R, 3R and 4R.

A voltage-responsive relay 19 is provided for controlling the circuit of high-speed switch 15.

A discharge resistor r4 is connected, in parallel, to the generator field winding Gf. A second discharge resistor r5 is connected in parallel with the inductive circuit comprising the field winding R3 of regulator R and the choke coil 7.

While we may use any of the so-called "automatic" devices for commutating the circuits of the system during deceleration, we prefer to use a set of inductor relays 1R, 2R, 3R and 4R, mounted on the car C in position to cooperate with sets of inductor plates 4U, 3U, 2U, 1U, 1D, 2D, 3D and 4D of magnetic material mounted in the hatchway. The inductor relays may be of any type but are preferably of the type disclosed in a copending application of Harold W. Williams, Serial No. 279,711 (W. E. Case 14048) filed May 22, 1928 and assigned to the Westinghouse Electric and Manufacturing Company. The construction and operation of such relay may best be understood by reference to Fig. 5 which shows one diagrammatically.

Referring to Fig. 5, the relay 5R comprises a magnetic structure 5a having a central core portion 5b and a pair of small lugs 5c, all of magnetic material. A pair of armatures 5d and 5e of magnetic material are pivoted to the magnetic structure 5a. Each of the armatures 5d and 5e carries a movable contact member of a set of contact members 5UL and 5DL, respectively. Each of the armatures 5D and 5E is so mounted that, when it is in one position, the corresponding set of contact members 5UL or 5DL is closed, whereas, when the armature is in a second position, the corresponding set of contact members 5UL or 5DL is open, and the armature engages the corresponding lug 5c. The armatures 5D and 5E are biased, by any suitable means, to a position in which the sets of contact members 5UL and 5DL are closed. A winding 5L is mounted on the core portion 5b of the magnetic structure 5a. The magnetic structure 5a and the armatures 5d and 5e constitute a divided magnetic circuit, both branches of which are normally incomplete because of large air gaps between the upper portion of the magnetic structure and the relay armature.

The operation of such relay is as follows: as long as the winding 5L is deenergized, the armatures 5d and 5e remain in their biased positions, with the contact members 5UL and 5DL closed. Upon energization of the winding 5L, as by closure of a switch 5S, connecting the winding to a suitable source 5B, a magnetomotive force is impressed on the relay magnetic circuit. Because of the large air gaps, the flux set up in the relay magnetic circuit is insufficient to cause movement of the armatures. If a branch of the magnetic circuit is now completed, as by movement of the relay into a position adjacent to an inductor plate 5V, the corresponding armature 5d moves, against its bias, into a position to engage the corresponding lug 5c, opening the corresponding set of contact members 5UL. If the relay now moves beyond the inductor plate 5V, the contact members 5UL remain open, as the armature 5d is held against its bias because of the magnetic sticking action of lug 5c. If, while the coil 5L is still energized, the second branch of the magnetic circuit is completed by movement of the relay 5R adjacent to a second inductor plate, the contact members 5DL are opened, remaining open after the relay moves past the second inductor plate because of the action of lugs 5c. If the winding 5L is now deenergized, by opening the switch 5S, the armatures 5e and 5d are released from the lugs 5c and return to their biased positions, closing the contact member 5UL and 5DL. If the relay 5R, while the winding 5L is deenergized, moves adjacent to other inductor plates, the armatures 5e and 5d are not affected and the contact members 5UL and 5DL remain closed. The contact members 5UL or 5DL are, therefore, opened only when the relay arrives at a position adjacent to an inductor plate while the relay winding is energized; and, when opened, remain open, regardless of the position of the relay with respect to inductor plates, until the coil of the relay is deenergized.

Returning to Fig. 4, a set of inductor plates 4U, 3U, 2U, 1U, 1D, 2D, 3D and 4D, as previously mentioned, is mounted in the hatchway in cooperative relation to the inductor relays carried by the car C. While we have illustrated only one complete set of inductor plates, it will be understood that one complete set is provided for each floor, except the top and bottom floors. A set, corresponding to inductor plates 1U, 2U, 3U and 4U, is provided for the top floor, and a set, corresponding to inductor plates 1D, 2D, 3D and 4D, is provided for the bottom floor.

A car switch 20 is mounted in the car C for controlling the reversing switches 21, 22, 3 and 4, brake relay 17, intermediate-speed switch 14 and high-speed switch 15 in a manner to be hereinafter more fully described.

The operation of the above described apparatus may be set forth as follows: preliminary to operation of the elevator car, the switches 1 and 2 are closed. Upon closure of the switch 1, the supply conductors L1 and L2 are connected to the direct-current source S1. This completes a circuit for the field winding Mf of motor M, and the field of the motor builds up in the usual manner. Upon closure of the switch 2, the primary windings of induction motor DM are connected to the alternating-current source S2. The induction motor DM, generator G and exciter E now accelerate to running speed. As the field winding Gf of generator G is, at this time, disconnected, the generator G generates no voltage, the current in the common armature circuit of generator G and motor M is zero, and the motor M and elevator car C are at rest.

The operation of the elevator car may now be initiated by movement of the car switch 20. Assuming that the elevator car is standing at the first floor and it is desired to make a run to the third floor, the operator moves the handle of car switch 20 to the right. Upon movement of the handle of car switch 20 to the right to its first operating position, contact segment 20b of the car switch bridges contact members 20a and 20c, completing an energizing circuit for the operating coil of relay 18. This circuit may be traced from supply conductor L2, through contact members 20a, 20b and 20c of car switch 20, the operating coil of relay 18, thence through the safety devices, to supply conductor L1. Relay 18 operates to open its contact members in the circuit of the coils 1L, 2L, 3L and 4L of inductor relays 1R, 2R, 3R and 4R, respectively.

Upon further movement of the handle of car switch 20 to the right, contact segment 20b of the car switch bridges contact members 20a and 20d, completing an energizing circuit for the operating coils of reversing switches 21 and 3, and brake relay 17. This circuit extends from supply conductor L2, through contact members 20a, 20b and 20d of the car switch, contact members 1UL of inductor relay 1R, interlock contact members of reversing switch 22, the operating coil of reversing switch 21, the operating coil of reversing switch 3 and the operating coil of brake relay 17, and thence, through the safety devices, to supply conductor L1. The energizing circuit for low-speed switch 13 extends from supply conductor L2, through contact members 2UL of inductor relay 2, contact members of reversing switch 21, the operating coil of low-speed switch 13 and the safety devices, to supply conductor L1, thus closing low-speed switch 13.

Reversing switch 3, in closing, connects the conductor 6 to supply conductor L1.

Brake relay 17, in closing, closes contact members 17a in the circuit of the coils 1L, 2L, 3L and 4L of inductor relays 1R, 2R, 3R and 4R and completes an energizing circuit for the release coil of brake B by the closure of contact members 17b. As the circuit of the coils 1L, 2L, 3L and 4L is, at this time, open at the contact members of relay 18, the closure of contact members 17a has no immediate effect. Completion of the circuit of the release coil of brake B causes the brake to release.

Low-speed switch 13, in closing, short circuits a section of resistor $r2$; opens contact members in series with conductor 9; and closes contact members in series with conductor 10.

The connection of conductor 5 to supply conductor L2, by closure of reversing switch 21 and the connection of conductor 6 to supply conductor L1, complete circuits for the potentiometer resistor $r1$ and for the winding R3 of regulator R. As the common circuit of the generator-separately-excited field winding $Gf$ and the armature of regulator R is, at this time, connected across a portion of the potentiometer resistor $r1$, through conductors 8 and 10, a voltage is impressed upon the field winding $Gf$, and the current in the latter winding builds up. At the same time, current in the winding R3 of regulator R commences to build up at a rate determined by the ratio of the inductance of the winding R3 and the choke 7 to the resistance of the winding R3 and the resistor $r2$. As the current in winding R3 builds up, the regulator R generates a voltage which acts upon the field winding $Gf$ in the same direction as the voltage from the potentiometer resistor $r1$. The current in field winding $Gf$, therefore, builds up rapidly, causing the voltage of generator G to increase and a current to flow in the common armature circuit of generator G and motor M. This armature current causes the motor M to exert a torque and to accelerate. As the motor M accelerates, its counter-electro-motive force increases, causing the windings R1 and R2 of regulator R to exert a magnetmotive force to oppose the magnetomotive force of winding R3. When the actual speed of motor M equals the value corresponding to the instantaneous value of the current in the field winding R3, the magnetomotive force caused by the joint action of windings R1 and R2 becomes equal to the magnetomotive force caused by the winding R3, and the voltage of regulator R disappears. The rate of acceleration of motor M is, in this way, fixed by the rate of increase of current in the circuit of winding R3. Any deviation of the speed of motor M from the desired value, corresponding to the current in field winding R3, results in the development, by the regulator R, of a correcting voltage tending to reduce the deviation. As mentioned above, the ratio of the percentage of change of voltage impressed upon the field winding $Gf$ to the percentage of error of motor speed which caused it, may, by the design of the regulator R, be fixed at any desired value. In this way, the possible deviations of the rate of acceleration of motor M from the desired rate fixed by the rate of change of current in field winding R3 may be reduced to any desired minimum.

Upon further movement of the handle of car switch 20 to the right, contact segment 20b of the car switch bridges contact members 20a and 20e, completing an energizing circuit for the operating coil of intermediate-speed switch 14. This circuit extends from supply conductor L2, through contact members 20a, 20b and 20e of the car switch 20, through contact members 3UL of inductor relay 3R, contact members of reversing switch 21, the operating coil of intermediate-speed switch 14 and the safety devices, to supply conductor L1, thus closing intermediate-speed switch 14.

Intermediate-speed switch 14, in closing, completes an intermediate-speed holding circuit; opens contact members in series with the windings 1L and 2L of inductor relays 1R and 2R; partially completes a circuit for the operating coil of high-speed switch 15; short circuits a section of resistor $r2$; opens contact members in series with conductor 10; and closes contact members in series with conductor 11.

The intermediate-speed holding circuit mentioned above may be traced from the lower horizontal portion of supply conductor L2, through conductor 32, contact members of intermediate speed switch 14, contact members 3UL of inductor relay 3R, contact members of reversing switch 21, the operating coil of intermediate-speed switch 14 and thence, through the safety devices, to supply conductor L1.

The short circuiting of a section of resistor $r2$, by the closure of switch 14, causes the current in winding R3 of regulator R to build up to a second value, the rate of change of current in the circuit of winding R3 being determined, as before, by the inductance and resistance of the circuit. At the same time, the opening of contact members of switch 14 in series with conductor 10, and the closure of contact members of switch 14 in series with conductor 11 increases the voltage impressed on the common circuit of the armature of regulator R and the field winding G$f$ to a higher value. The motor M now accelerates, at a rate determined by the rate of change of current in the field winding R3, to intermediate speed. Shortly before the speed of motor M attains intermediate-speed value, the voltage of generator G becomes sufficient to cause operation of the voltage-responsive relay 19. Relay 19 closes to partially complete an energizing circuit for the operating coil of high-speed switch 15.

As the handle of car switch 20 is moved farther to the right, contact segment $20b$ bridges contact members $20a$ and $20f$, thus completing the energizing circuit for the operating coil of high-speed switch 15. This circuit extends from supply conductor L2, through contact members $20a$, $20b$ and $20f$ of car switch 20, contact members 4UL of inductor relay 4R, contact members of reversing switch 21, contact members of voltage-responsive relay 19, contact members of intermediate-speed switch 14, the operating coil of high-speed switch 15 and thence, through the safety devices, to supply conductor L1, thus closing high-speed switch 15.

High-speed switch 15, in closing, establishes a high-speed holding circuit; opens contact members in the circuit of winding 3L of inductor relay 3R; completes an energizing circuit for the operating coil of transfer relay 16; short circuits a section of resistor $r2$; connects the common circuit of the armature of regulator R and the field winding G$f$ of generator G, through conductor 12, to conductor 5; and opens the circuit of potentiometer resistor $r1$.

The high-speed holding circuit, mentioned above, extends from the lower horizontal portion of supply conductor L2, through conductor 23, contact members of high-speed switch 15, contact members 4UL of inductor relay 4R, contact members of reversing switch 21, contact members of voltage-responsive relay 19, contact members of intermediate-speed switch 14, the operating coil of high-speed switch 15 and the safety devices, to supply conductor L1.

The energizing circuit for the operating coil of transfer relay 16 extends from supply conductor L2, through contact members of high-speed switch 15, the operating coil of transfer relay 16 and contact members $17b$ of brake relay 17, to supply conductor L1 to close transfer relay 16.

Transfer relay 16, in closing, establishes a holding circuit for itself, independent of high-speed switch 15, by closure of its contact members $16a$; closes its contact members $16b$; and opens its contact members $16c$. As the potentiometer resistor $r1$ is at this time disconnected, the closure of contact members $16b$ and the opening of contact members $16c$ have no immediate effect.

The short circuiting of a section of resistor $r2$ by the closure of high-speed switch 15 causes the current in winding R3 of regulator R to build up to a third value, the rate of change of this current, as before, being determined by the inductance and resistance of the circuit. At the same time, the closure of contact members in series with conductor 12 increases the voltage impressed upon the common circuit of the armature of regulator R and the field winding G$f$ to the full voltage between supply conductors L1 and L2. The motor M now accelerates, at a rate determined by the rate of change of current in the field winding R3, to high speed.

The elevator car C is now at some point in the hatchway between the first and third floors, moving upward at full speed. If it is desired to stop the car at the third floor, the attendant centers the car switch 20 shortly before the car C reaches such position that the inductor relay 4R is opposite the inductor plate 4U for the third floor. Upon the centering of car switch 20, the closing circuits for high-speed switch 15, intermediate-speed switch 14, reversing switches 21 and 3 and relay 18 are broken at contact members $20f$, $20e$, $20d$ and $20c$, respectively. High-speed switch 15, intermediate-speed switch 14 and reversing switches 21 and 3 do not drop out at this time, however, as they are held in through the high-speed, intermediate-speed and "up" holding circuits previously traced. Relay 18 drops out, completing an energizing circuit for the coil 4L of inductor relay 4R. This circuit extends from supply conductor L2, through contact members of relay 18, the coil 4L, contact members $17a$ of brake relay 17 and the safety devices, to supply conductor L1. The contact members of inductor relay 4R do not immediately open, as both branches of the relay magnetic circuit are incomplete.

The car C continues upward at high speed until the inductor relay 4R arrives at the position opposite inductor plate 4U for the third floor. When this occurs, a branch of the relay magnetic circuit is completed, and contact members 4UL of the relay 4R open, breaking the holding circuit for high-speed switch 15, thereby causing the latter switch to drop out.

High-speed switch 15, in dropping out, opens contact members in series with conductor 23; completes an energizing circuit for the coil 3L of inductor relay 3R; opens contact members in the closing circuit of transfer relay 16; reinserts a section of resistor $r2$ in series with field winding R3; opens contact members in series with conductor 12; and reestablishes the connection of potentiometer resistor $r1$ to conductors 5 and 6.

The energizing circuit for the coil 3L of inductor relay 3R extends from supply conductor L2, through contact members of relay 18, the coil 3L of inductor relay 3R, contact members of high-speed switch 15, contact members 17a of brake relay 17 and the safety devices, to supply conductor L1. Transfer relay 16 remains closed because of its holding circuit extending through its contact members 16a.

The re-insertion of the section of resistor $r2$ causes the current in the field winding R3 to decrease at a rate determined by the inductance and the resistance of its circuit. At the same time, the opening of contact members of high-speed switch 15 in series with conductor 12 and the re-establishment of the circuit through potentiometer resistor $r1$, reduce the voltage applied to the common circuit of the armature of regulator R. The speed of motor M now decreases at a rate, determined by the rate of change of current in field winding R3, to intermediate-speed value.

As the car C continues upward at intermediate speed, the inductor relay 3R arrives at a position opposite the inductor plate 3U. When this occurs, contact members 3UL of the inductor relay 3R open, breaking the intermediate-speed holding circuit and causing intermediate-speed switch 14 to drop out.

Intermediate-speed switch 14, in dropping out, opens contact members in series with conductor 32; completes an energizing circuit for the coils 2L and 1L of inductor relays 2R and 1R, respectively; opens contact members in the circuit of high-speed switch 15; reinserts a section of resistor $r2$; opens contact members in series with conductor 11 and closes contact members in series with conductor 10.

The energizing circuit for the coils 2L and 1L of conductor relays 2R and 1R may be traced from supply conductor L2, through contact members of relay 18, through the coils 2L and 1L in parallel and thence, through contact members of intermediate-speed switch 14, contact members 17a of brake relay 17 and the safety devices, to supply conductor L1.

The re-insertion of the section of resistor $r2$ causes the current in the field winding R3 to decrease at a rate determined by the inductance and the resistance of its circuit. At the same time, the opening of contact members of intermediate-speed switch 14 in series with conductor 11 and the closure of contact members in series with conductor 10 reduce the voltage applied to the common circuit of the armature of regulator R and the field winding Gf. The speed of motor M now decreases at a rate determined by the rate of change of current in the field winding R3 to low-speed value.

As the car C continues upward at low speed, the inductor relay 2R arrives at a position opposite the inductor plate 2U. When this occurs, contact members 2UL of the inductor relay 2R open, breaking the circuit of low-speed switch 13, whereupon low-speed switch 13 drops out.

Low-speed switch 13, in dropping out, inserts a section of resistor $r2$; opens contact members in series with conductor 10 and closes contact members in series with conductor 9.

The insertion of the section of resistor $r2$ causes the current in the field winding R3 to decrease at a rate determined by the inductance and the resistance of its circuit. At the same time, the opening of contact members of low-speed switch 13 in series with conductor 10 and the closure of contact members in series with conductor 9 reduce the voltage applied by the potentiometer resistor $r1$ to the common circuit of the armature of regulator R and the field winding Gf. The speed of motor M now decreases at a rate determined by the rate of change of current in the field winding R3 to a low levelling-speed value.

As the car C continues upward at levelling speed, the inductor relay 1R arrives at a position opposite the inductor plate 1U. When this occurs, contact members 1UL of the inductor relay 1R open, breaking the "up" holding circuit and reversing switches 21 and 3 and brake relay 17 drop out.

Reversing switch 21, in dropping out, opens contact members in series with conductor 31; closes interlock contact members in series with reversing switches 22 and 4; opens contact members in the circuits of low-speed switch 13, intermediate-speed switch 14 and high-speed switch 15, respectively, and disconnects the conductor 5 from supply conductor L2. Reversing switch 3, in dropping out, disconnects condutor 6 from supply conductor L1. Brake relay 17, in dropping out, breaks a common circuit for coils 1L, 2L, 3L and 4L of the inductor relays at contact members 17a and breaks a common circuit for the release coil of brake B and the operating coil of transfer relay 16 at contact members 17b. The brake B is applied to bring the car to rest, and the transfer relay 16 drops out.

The car is now at rest at the third floor, the car switch 20 is centered, and the various switches and relays of the system are in the positions which they were in before the car switch C was moved to bring the car to the third floor. Further operation of the car C in either direction may now be initiated by movement of the car switch 20.

The operation so far described is that performed in making a run of two or more floors. In making a one-floor run, the operation is slightly different. In making a one-floor run upward, for example, the operator moves the handle of car switch 20 to the left to its high-speed position and then immediately centers it. Relay 18, reversing switches 21 and 3, brake relay 17, low-speed switch 13 and intermediate-speed switch 14 now pick up, and the brake B is released in the manner previously described. High-speed switch 15, however, does not close, as the voltage of generator, G at the time the car switch 20 is centered, is not sufficient to cause operation of voltage-responsive relay 19. As the high-speed switch 15 does not close, no circuit is established for the transfer relay 16, and the latter relay remains open also. The connection of the common circuit of the armature of regulator R and field winding $Gf$ to the potentiometer resistor $r1$ is, therefore, completed through conductor 11 and contact members $16c$ rather than through conductor 11 and contact members $16b$. The voltage applied to the common circuit is, therefore, somewhat lower than that applied in making a run of two or more floors. The first step of deceleration is initiated by inductor relay $3R$. The remaining steps of deceleration are initiated by inductor relays $2R$ and $1R$, in the manner previously described.

It will be understood that the above described elevator system is illustrative only and that many devices which would be used in practice such as limit switches, door and gate interlocks, brake resistors, a generator suicide connection, etc., have been omitted for simplicity. While we have shown a specific means for controlling the rate of change of current in the field winding $R3$, i. e., an inductive circuit, it will be understood that any of a large number of regulating means may be used for this purpose.

While, because of the advantages of the arrangement, we prefer to use a single regulating machine R, our invention may be practiced in other ways. The two windings R1 and R2, designed to produce a magnetomotive force proportional to the motor speed, may be replaced by other apparatus for accomplishing the same result. While we prefer to introduce the correction voltage generated by regulator R into the generator-separately-excited field circuit, we may introduce this voltage into other circuits of the system consistent with the desired result of reducing the difference between the actual speed of the motor and the speed determined by the control means. By introducing the correction voltage of regulator R into circuits other than the generator field circuit, we may practice our invention in motor-control systems other than those of the variable-voltage type.

We do not wish to be restricted to the specific structural details, arrangement of parts or circuit connections herein set forth, as various modifications thereof may be effected without departing from the spirit and scope of our invention. We desire, therefore, that only such limitations shall be imposed as are indicated in the appended claims.

We claim as our invention.

1. The method of controlling the speed of an electric motor which comprises so varying a component of voltage applied to the motor armature that the value of said component bears a predetermined ratio to a selected value of motor speed, and so varying a second component of voltage applied to the motor armature that the value of said second component bears a pre-determined higher ratio to the difference between the actual value of motor speed and the selected value and said second component acts in a direction to reduce said difference.

2. The method of controlling the speed of an electric motor which comprises establishing values of a control component of voltage applied to the armature of the motor corresponding to desired values of motor speed, varying a correction voltage in accordance with the difference between the actual speed of the motor and the speed corresponding to said control component and varying a component of voltage applied to a circuit of said motor in accordance with said correction voltage in a direction to reduce the difference between the actual speed of said motor and the desired speed corresponding to said control voltage; said correction voltage acting, upon the occurrence of a given error in motor speed, to produce a greater percentage change in the total voltage of the motor circuit upon which it acts than the corresponding percentage error of motor speed.

3. The method of controlling an electric motor to cause the speed of the motor to follow a pre-determined succession of desired values which comprises so varying a control voltage that it follows, during a predetermined time interval a succession of values which bear a pre-determined ratio to the corresponding desired value of motor speed; so varying a correction voltage that, at any instant, it bears a ratio higher than said pre-determined ratio to the difference between the actual speed of the motor at that instant and the corresponding desired speed; and so varying components of voltage applied to the circuits of said motor in accordance with said control voltage and said correction voltage that said correction voltage acts to cause the speed of the motor to approximately follow said pre-determined succession of desired values, during said time interval and said correction voltage acts to reduce the difference between the succession of actual values of motor speed and the pre-determined succession of desired values.

4. The method of controlling an electric motor to cause the speed of the motor to follow a pre-determined succession of desired values which comprises so varying a control voltage that it follows, during a pre-determined time interval a succession of values each of which bears a pre-determined ratio to the desired value of motor speed; so varying a correction voltage that, at any instant, it bears a ratio higher than said pre-determined ratio, to the difference between the actual speed of the motor, at that instant, and the corresponding desired speed; so varying components of voltage applied to the circuits of the motor in accordance with said control voltage and said correction voltage that said control voltage acts to cause the speed of the motor to approximately follow said pre-determined succesion of desired values during said time interval and said correction voltage acts to reduce the difference between the succession of actual values of motor speed and the pre-determined succession of desired values; and limiting the maximum value of said correction voltage to a pre-determined fraction of the maximum value of said control voltage.

5. The method of controlling an electric motor to cause the speed of the motor to follow a pre-determined succession of desired values which comprises so varying a magnetomotive force that it follows a succession of values corresponding to the pre-determined succession of desired values of motor speed and simultaneously so varying a control voltage that it follows a succession of values corresponding to the pre-determined succession of desired values of motor speed; varying a second magnetomotive force acting in opposite direction to said first mentioned magnetomotive force in acordance with the actual speed of the motor; translating the resultant of said magnetomotive forces into the form of a correction voltage; and so varying components of voltage applied to the circuits of said motor in acordance with said control voltage and said correction voltage that said correction voltage acts to cause the speed of the motor to approximately follow said pre-determined succession of desired values and said correction voltage acts to reduce the difference between the succession of actual values of motor speed and the pre-determined succession of desired values.

6. In a motor-control system, a motor, a generator, electrical connections completing a circuit including the armatures of said motor and said generator, means for so varying a component of the excitation of said generator that the value of said component bears a predetermined ratio to a selected value of motor speed, and means for so varying a second component of excitation of said generator that the value of said second component bears a pre-determined higher ratio to the difference between the actual value of motor speed and the selected value and said second component acts in a direction to reduce said difference.

7. In a motor-control system, a motor having an armature and a field winding, a generator having an armature and a field winding, a source, electrical connections completing a first circuit including said armatures, electrical connections completing a second circuit including the field winding of said motor and said source, electrical connection completing a third circuit including the field winding of said generator and said source, regulator-armature means included in one of said circuits, control means for varying the current in said third circuit to vary the speed of said motor and means for varying the total voltage developed by said regulator-armature means in accordance with the difference between the actual speed of said motor and the speed determined by said control means and in a direction to reduce said difference.

8. In a motor-control system, a motor having an armature and a field winding, a generator having an armature and a field winding, a source, electrical connections completing a first circuit including said armatures, electrical connections completing a second circuit including the field winding of said motor and said source, electrical connections completing a third circuit including the field winding of said generator and said source, regulator-armature means included in one of said circuits, control means for varying the current in said third circuit to vary the speed of said motor, and means for varying the total voltage developed by said regulator means in accordance with the difference between the actual speed of said motor and the speed determined by said control means and in such manner that said regulator means acts, upon the occurrence of a given error in motor speed, to produce a greater percentage change in the total voltage of the circuit in which it is included than the corresponding percentage error of motor speed and in a direction to reduce the error.

9. In an elevator system, an elevator car; a dynamo-electric machine for driving said car; a second dynamo-electric machine; electrical connections completing a circuit including the armatures of said dynamo-electric machines; regulator means comprising a first excitation means; a second excitation means and armature means excited by said excitation means; control means for simultaneously varying a component of excitation of said second dynamo-electric machine and the excitation effect of said first excitation means to vary the speed of said car; means for varying the excitation effect of said second excitation means in accordance with the actual speed of said car; and means, including said armature means, for varying a component of excitation of one of said dynamo-electric machines to reduce the difference between the actual speed of said car and the speed determined by said control means.

10. In an elevator system, an elevator car; a dynamo-electric machine for driving said car; a second dynamo-electric machine; electrical connections completing a circuit including the armature of said dynamo-electric machines; a regulator comprising a field structure and an armature; control means for simultaneously varying a component of excitation of said second dynamo-electric machine and a component of magnetomotive force in said field structure to vary the speed of said car; means for varying a second component of magnetomotive force in said field structure in accordance with the actual speed of said car; and means including the armature of said regulator, for varying a component of excitation of one of said dynamo-electric machines to reduce the difference between the actual speed of said car and the speed determined by said control means.

11. In an elevator system, an elevator car; a dynamo-electric machine for driving said car; a second dynamo-electric machine; electrical connections completing a circuit including the armature of said dynamo-electric machines; a regulator comprising a field structure designed to become saturated at a pre-determined value of impressed magnetomotive force, and an armature wound to generate a pre-determined maximum voltage when said field structure is saturated; means for simultaneously varying a component of excitation of said second dynamo-electric machine, and a component of magnetomotive force in said field structure to vary the speed of said car; means for varying a second component of magnetomotive force in said field structure in accordance with the actual speed of said car; and means, including the armature of said regulator, for varying a correction component of excitation of one of said dynamo-electric machines in proportion to the difference between the actual speed of said car and the speed determined by said control means within a pre-determined range of values of said difference and to maintain said correction component substantially constant for value of said difference beyond said pre-determined range, said correction component acting in a direction to reduce said difference.

12. In an elevator system, an elevator car; a motor for driving said car; a generator; electrical conections completing a circuit including the armatures of said motor and said generator; regulator means comprising a first excitation means, a second excitation means and an armature means excited by said excitation means; control means for simultaneously varying a component of excitation of said generator and the excitation effect of said first excitation means to vary the speed of said car; means for varying the excitation effect of said second excitation means in accordance with the actual speed of said car; and means, including said armature means, for varying a second component of excitation of said generator to reduce the difference between the actual speed of said car and the speed determined by said control means.

13. In an elevator system, an elevator car; a motor for driving said car; a generator; electrical connections completing a circuit including the armatures of said motor and said generator; a regulator comprising a field structure designed to become saturated at a pre-determined value of impressed magnetomotive force, and an armature wound to generate a pre-determined maximum voltage when said field structure is saturated; means for simultaneously varying a component of excitation of said generator and a component of magnetomotive force in said field structure to vary the speed of said car; means for varying a second component of magnetomotive force in said field structure in accordance with the actual speed of said car; and means, including the armature of said regulator, for varying a second component of excitation of said generator in accordance with the difference between the actual speed of said car and the speed determined by said control means within a pre-determined range of values of said difference and to maintain said second component substantially constant for values of said difference beyond said pre-determined range, and second component acting in a direction to reduce said difference.

14. In an elevator system, an elevator car; a motor for driving said car; a generator; electrical connections completing a circuit, including the armatures of said motor and said generator; a regulator comprising a field structure and an armature; control means for simultaneously varying a component of excitation of said generator and a component of magnetomotive force in said field structure to vary the speed of said car; means for varying a second component of magnetomotive force in said field structure in accordance with the actual speed of said car; and means, including the armature of said regulator, for varying a second component of excitation of said generator to reduce the difference between the actual speed of said car and the speed determined by said control means.

15. In an elevator system, an elevator car;

a motor for driving said car; a generator, a regulator comprising a field structure, an armature and a set of field windings mounted on said field structure, said set of field windings comprising a first winding, a second winding and a third winding, electrical connections completing a circuit including the armatures of said motor and said generator and said first field winding; conductors connecting said second field winding in parallel with the armature of said motor; a source; a first resistance means; conductors connecting a field winding of said generator to said source in circuit with said first resistance means; a second resistance means; conductors connecting said third field winding to said source of circuit with said second resistance means; and control means for simultaneously varying the resistance of said resistance means.

16. In an elevator system, an elevator car; a dynamo-electric machine for driving said car in a hatchway past a plurality of landings; a second dynamo-electric machine; electrical connections completing a circuit including the armatures of said dynamo-electric machines; means for causing said car to operate at high speed comprising means for establishing a high value of excitation in said second dynamo-electric machine; slow-down means for causing said car to operate at a predetermined speed lower than high speed comprising means for establishing a control component of excitation in said second dynamo-electric machine having a predetermined value corresponding to said predetermined speed, and means for establishing a correction component of excitation in one of said dynamo-electric machines having a value proportional to the difference between the actual speed of said car and said predetermined speed, said correction component acting in a direction to reduce said difference; and means responsive to the position of said car for initiating operation of said slow-down means.

17. In an elevator system, an elevator car; a motor for driving said car in a hatchway past a plurality of landings; a generator; electrical connections completing a circuit, including the armatures of said motor and said generator, means for causing said car to operate at high speed comprising means for establishing a high value of excitation in said generator; slow-down means for causing said car to operate at a pre-determined speed lower than high speed comprising means for establishing a control component of excitation in said generator having a predetermined value corresponding to said predetermined speed, and means for establishing a correction component of excitation in said generator having a value proportional to the difference between the actual speed of said car and said pre-determined speed, said correction component acting in a direction to reduce said difference; and means responsive to the position of said car for initiating operation of said slow-down means.

18. In an elevator system, an elevator car; a motor for driving said car in a hatchway past a plurality of landings; a generator; electrical connections completing a circuit, including the armatures of said motor and said generator; means for causing said car to operate at high speed comprising means for establishing a high value of excitation in said generator; slow-down means for causing the speed of the car to follow a pre-determined diminishing sequence of desired values comprising means for so varying a control component of the excitation of said generator that it follows a succession of values corresponding to the pre-determined sequence of desired values of car speed, and means for so varying a correction component of excitation of said generator that, at any instant, it has a value proportional to the difference between the actual speed of said car at that instant and the corresponding desired speed and acts in a direction to reduce said difference; and means responsive to the position of said car for controlling said slow-down means.

In testimony whereof, we have hereunto subscribed our names this 13th day of October, 1930.

KENNETH M. WHITE.
GEORGE K. HEARN.